(12) United States Patent
Yokoyama (10) Patent No.: US 7,766,376 B2
(45) Date of Patent: Aug. 3, 2010

(54) VEHICULAR AIR BAG, AIR BAG MODULE HAVING THE VEHICULAR AIR BAG AND METHOD OF FOLDING THE AIR BAG

(75) Inventor: Aki Yokoyama, Fuji (JP)

(73) Assignee: Nihon Plast Co., Ltd. (JP)

( * ) Notice: Subject to any disclaimer, the term of this patent is extended or adjusted under 35 U.S.C. 154(b) by 284 days.

(21) Appl. No.: 11/522,467

(22) Filed: Sep. 18, 2006

(65) Prior Publication Data

US 2007/0075530 A1 Apr. 5, 2007

(30) Foreign Application Priority Data

Sep. 30, 2005 (JP) .............................. 2005-287039

(51) Int. Cl.
*B60R 21/213* (2006.01)
*B60R 21/237* (2006.01)
(52) U.S. Cl. ................................. 280/730.2; 280/743.1
(58) Field of Classification Search ............. 280/728.1, 280/728.2, 730.2, 743.1; 493/243, 250
See application file for complete search history.

(56) References Cited

U.S. PATENT DOCUMENTS

| | | | | |
|---|---|---|---|---|
| 5,022,675 A * | 6/1991 | Zelenak et al. | ........... | 280/743.1 |
| 5,382,048 A * | 1/1995 | Paxton et al. | ........... | 280/728.1 |
| 5,746,690 A * | 5/1998 | Humbarger et al. | ........ | 493/405 |
| 5,884,939 A * | 3/1999 | Yamaji et al. | ........... | 280/743.1 |
| 6,029,996 A * | 2/2000 | Yoshioka et al. | ............ | 280/740 |
| 6,196,585 B1 * | 3/2001 | Igawa | ..................... | 280/743.1 |
| 6,364,349 B1 * | 4/2002 | Kutchey et al. | .......... | 280/730.2 |
| 6,371,512 B1 * | 4/2002 | Asano et al. | ............. | 280/730.2 |
| 6,619,691 B1 * | 9/2003 | Igawa | ........................ | 280/732 |
| 6,626,456 B2 * | 9/2003 | Terbu et al. | .............. | 280/728.2 |
| 6,709,006 B2 * | 3/2004 | Okamoto | ................. | 280/728.2 |
| 6,739,622 B2 * | 5/2004 | Halford et al. | ........... | 280/743.1 |
| 6,758,490 B2 * | 7/2004 | Hoeft et al. | .............. | 280/730.2 |
| 6,793,241 B2 * | 9/2004 | Wallner et al. | ........... | 280/730.2 |
| 7,004,501 B2 * | 2/2006 | Schneider et al. | ........ | 280/743.1 |
| 7,097,200 B2 * | 8/2006 | Wold | ....................... | 280/730.2 |
| 2002/0158451 A1 * | 10/2002 | Nusshor | ................... | 280/730.2 |
| 2002/0175503 A1 * | 11/2002 | Hess et al. | ................ | 280/730.2 |
| 2003/0116947 A1 * | 6/2003 | Yokoyama et al. | ....... | 280/730.2 |
| 2003/0120409 A1 * | 6/2003 | Takimoto et al. | .............. | 701/45 |
| 2003/0197358 A1 * | 10/2003 | Hawthorn et al. | ........ | 280/743.1 |
| 2004/0075256 A1 * | 4/2004 | Klaiber et al. | ........... | 280/730.2 |
| 2004/0164530 A1 * | 8/2004 | Sunabashiri | ............. | 280/730.2 |
| 2005/0023807 A1 * | 2/2005 | Kino et al. | ................ | 280/730.2 |
| 2005/0104345 A1 * | 5/2005 | Noguchi | ................... | 280/730.2 |
| 2005/0121887 A1 * | 6/2005 | Inoue et al. | ............... | 280/730.2 |
| 2005/0242551 A1 * | 11/2005 | Noguchi et al. | .......... | 280/730.2 |

FOREIGN PATENT DOCUMENTS

JP 2004-58848 2/2004

* cited by examiner

*Primary Examiner*—Paul N Dickson
*Assistant Examiner*—Laura Freedman
(74) *Attorney, Agent, or Firm*—NDQ&M Watchstone LLP (57) ABSTRACT

An air bag, includes 1) a roll part configured to be wound in a form of a roll when the air bag is in a folded state to be installed in a vehicle. The roll part includes a pushed part formed by pushing a part of an outer face of the air bag inward to the roll part in a certain pushing direction, such that the roll part has a decreased cross section by the pushing.

9 Claims, 7 Drawing Sheets

VEHICULAR AIR BAG, AIR BAG MODULE HAVING THE VEHICULAR AIR BAG AND METHOD OF FOLDING THE AIR BAG

BACKGROUND OF THE INVENTION

1. Field of the Invention

The present invention relates to a vehicular air bag, an air bag module having the air bag and a method of folding the air bag.

2. Description of the Related Art

Japanese Patent Application Laid-Open No. 2004-58848 (=JP2004058848) discloses an air bag 11 received at a vehicular interior upper part, where the air bag 1 protects a vehicular occupant head part at a sideward collision. The air bag 11 has such a structure that a base end thereof on an upper side is fixed to a side roof rail RR at a vehicular body upper part. With the above structure, the air bag 11 is installed in a space between the side roof rail RR and a head lining, in a such condition that an entirety of the air bag 11 is folded, from a leading end side, in a form of roll. A gas of an inflator 33 expands the air bag 11 at the sideward collision, a lower end part of the head lining is pushed and opened toward a vehicular interior side, thereby developing the air bag 11 downward, thus protecting the vehicular occupant head part.

According to the above conventional technology where the air bag 11 has a roll part wound in the form of roll from the leading end side, however, the thus folded air bag 11 is caused to have an enlarged cross section. In other words, winding tightly the roll part of the air bag 11 makes the winding operation difficult and increases resistance caused by rewinding when the air bag 11 is expanded. Therefore, it is necessary to loosely wind the roll part, thereby enlarging the entirety of the air bag 11 (having the roll part) in cross section.

Consequently, for installing, in the space between the side roof rail RR and the head lining, the air bag 11 having the large cross section in folded state, it is necessary to secure a large space. Due to the large space, the head lining is positioned toward the vehicular interior side, resulting in oppression of the vehicular interior space.

SUMMARY OF THE INVENTION

It is therefore an object of the present invention to provide a vehicular air bag which is easily installed on a vehicle and is small in cross section even when the air bag forms a roll part in its folded state. It is another object of the present invention to provide an air bag module having the above vehicular air bag. It is still another object of the present invention to provide a method of folding the air bag.

According to a first aspect of the present invention, there is provided an air bag, comprising: 1) a roll part configured to be wound in a form of a roll when the air bag is in a folded state to be installed in a vehicle, the roll part including: a pushed part formed by pushing a part of an outer face of the air bag inward to the roll part in a certain pushing direction, such that the roll part has a decreased cross section by the pushing.

According to a second aspect of the present invention, there is provided an air bag module, comprising: 1) an air bag configured to be installed, in a folded state, in a space which is defined in one of the followings: i) between a vehicular body and an interior material, and ii) between a seat frame and an exterior material, wherein, the air bag is so configured that, when expanded at a collision of a vehicle, the air bag opens any one of the interior material and the exterior material in an opening direction, thereby developing the any one of the interior material and the exterior material outward from the space, the air bag installed in the space, including: i) a roll part configured to be wound, from a leading end side of the air bag, in a form of a roll when the air bag is in the folded state, the roll part including: a pushed part formed by pushing a part of an outer face of the air bag inward to the roll part in a certain pushing direction, such that the roll part has a decreased cross section by the pushing, wherein, when the air bag is installed in the space, an anti-pushing direction of the roll part is substantially consistent with the opening direction for opening the any one of the interior material and the exterior material when the air bag is expanded.

According to a third aspect of the present invention, there is provided an air bag module adapted to be mounted along a side roof rail of a vehicular body and over a center pillar or a hand grip, the air bag module comprising: 1) an air bag produced by the following operations: i) rolling the air bag, and ii) pushing the air bag in a position substantially corresponding to the center pillar, such that the air bag has a decreased cross section.

According to a fourth aspect of the present invention, there is provided a method of folding an air bag, comprising: 1) flattening the air bag, to thereby form one of the followings on a base end side of the air bag; a single return part, and two return parts; 2) winding a remaining part of the air bag from a leading end of the air bag, to thereby form a roll part having an outer face of the air bag; 3) wrapping the roll part with the single return part or the two return parts in such a manner as to form a space part in a center of the roll part, to thereby form a first cross section of the roll part; and 4) pushing a lower end center part on the outer face in a pushing direction toward the center of the roll part, to thereby form a pushed part on the roll part.

According to a fifth aspect of the present invention, there is provided a method of folding an air bag, comprising: 1) flattening the air bag, to thereafter fold a base end of the air bag in such a manner that the base end forms a corrugated part; 2) folding a remaining part of the air bag, in a form of a roll, from a leading end of the air bag to the base end of the air bag, to thereby form a roll part such that the corrugated part is disposed on a rear side in a developing direction of the air bag; and 3) forming a pushed part by pushing the roll part from a front side to the rear side in a pushing direction opposite to the developing direction.

According to a sixth aspect of the present invention, there is provided a method of folding a curtain-type air bag which has a base end as a mounting part and is adapted to be developed along a side part of a vehicle, the method comprising: 1) flattening the air bag; 2) folding the air bag toward a base end of the air bag, to thereby form a roll part; and 3) pushing an outer face of a roll part, to thereby form a pushed part which is pushed inward from the outer face.

The other object(s) and feature(s) of the present invention will become understood from the following description with reference to the accompanying drawings.

DESCRIPTION OF THE PREFERRED EMBODIMENTS

In the following, an embodiment of the present invention will be described in detail with reference to the accompanying drawings.

For ease of understanding, the following description will contain various directional terms, such as left, right, upper, lower, forward, rearward and the like. However, such terms are to be understood with respect to only a drawing or drawings on which the corresponding part of element is illustrated.

Embodiment

<Structure>

Figure 1:
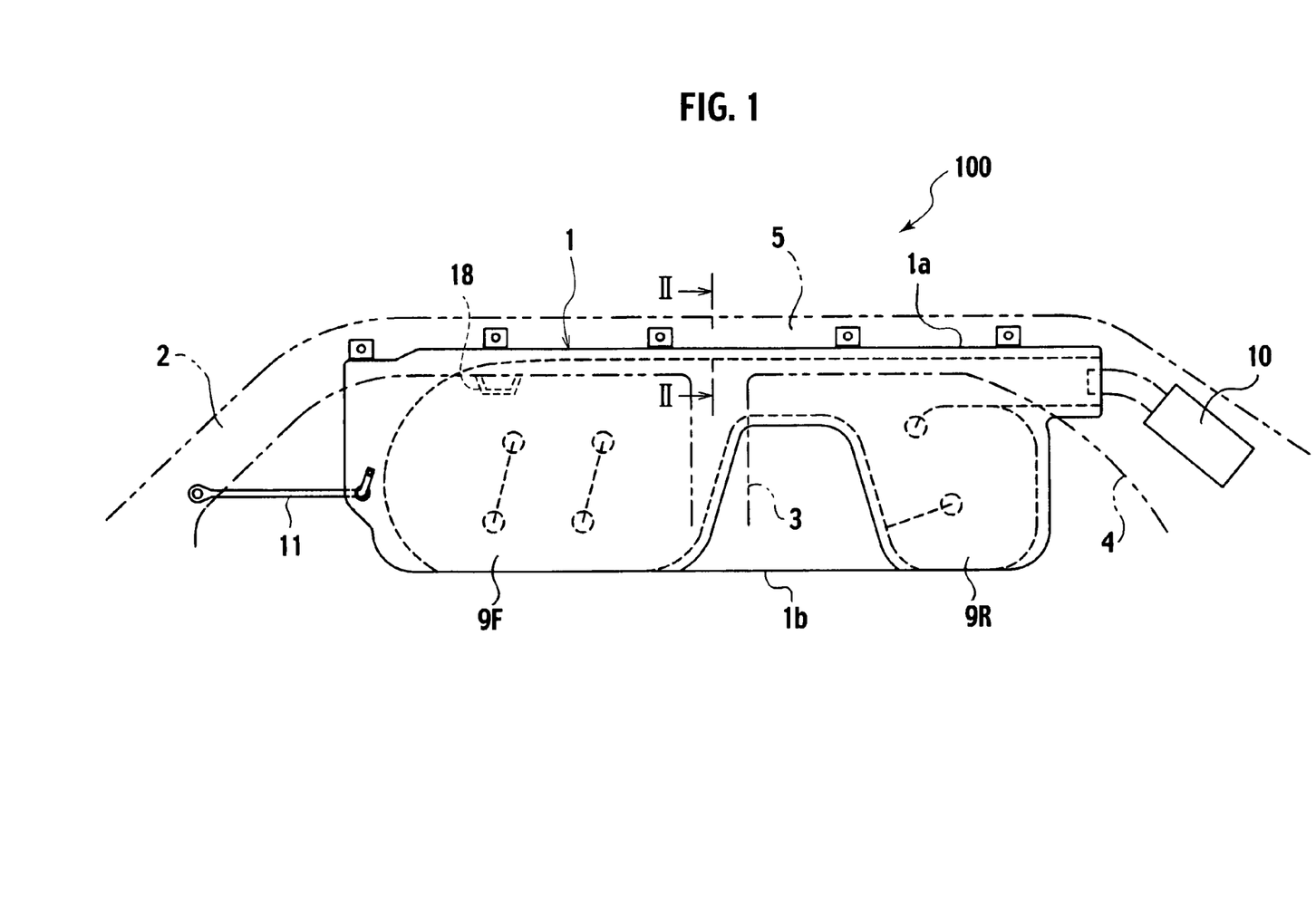
FIG. 1 is a side view of an air bag developed downward in a form of curtain, according to an embodiment of the present invention.

FIG. 1 to FIG. 6 each show an air bag 1 (otherwise referred to as "vehicular air bag 1"), according to an embodiment of the present invention. In FIG. 1, an upper part of a vehicle is viewed from a vehicular interior R side, with the air bag 1 developed downward in a form of curtain. Shown in FIG. 1 also include a front pillar 2, a center pillar 3 and a rear pillar 4. There is formed a side roof rail 5 (vehicular body) extending frontward-rearward on the front pillar 2, the center pillar 3 and the rear pillar 4.

Figure 2:
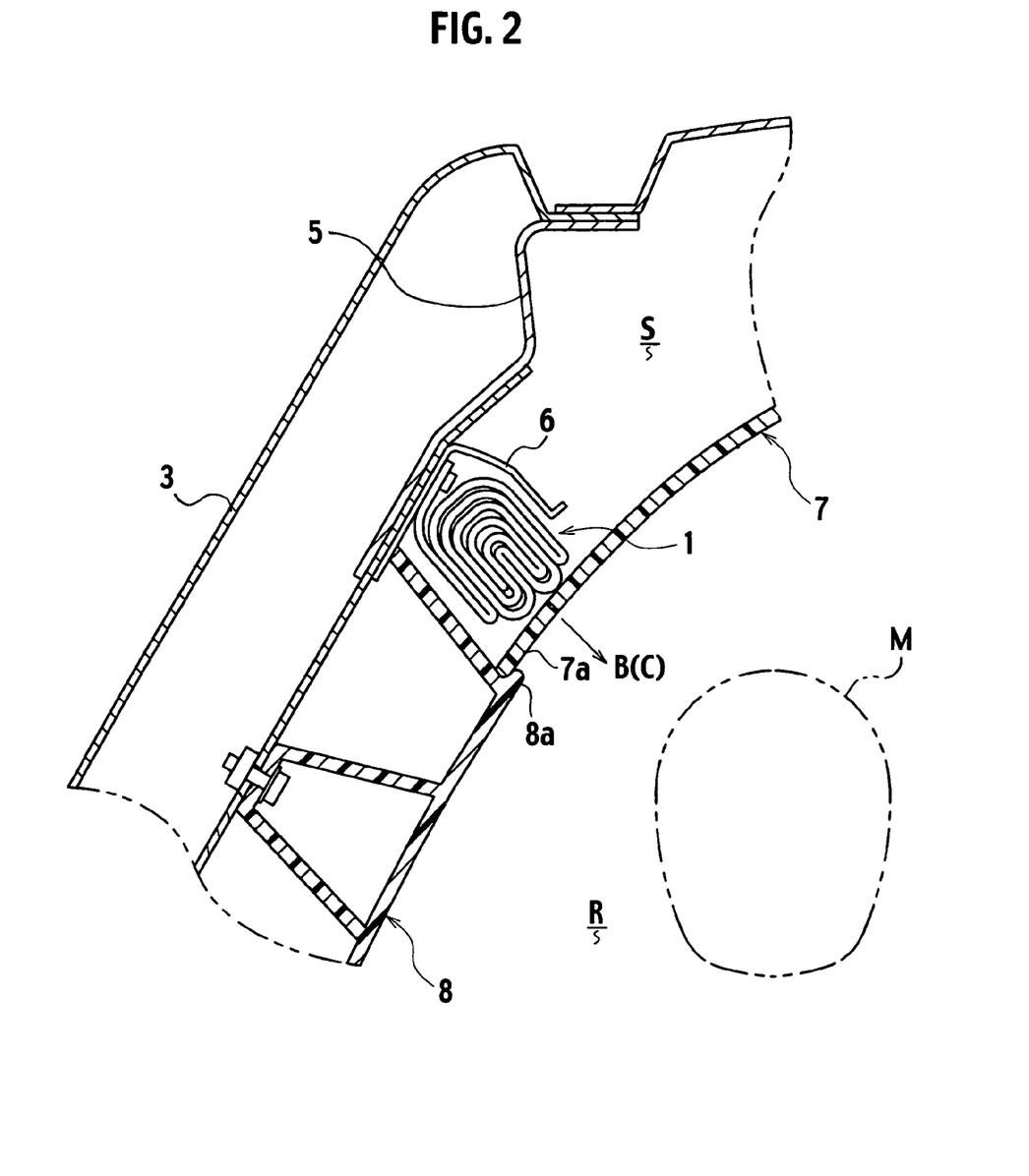
FIG. 2 is a cross sectional view taken along the lines II-II in FIG. 1.
Figure 3:
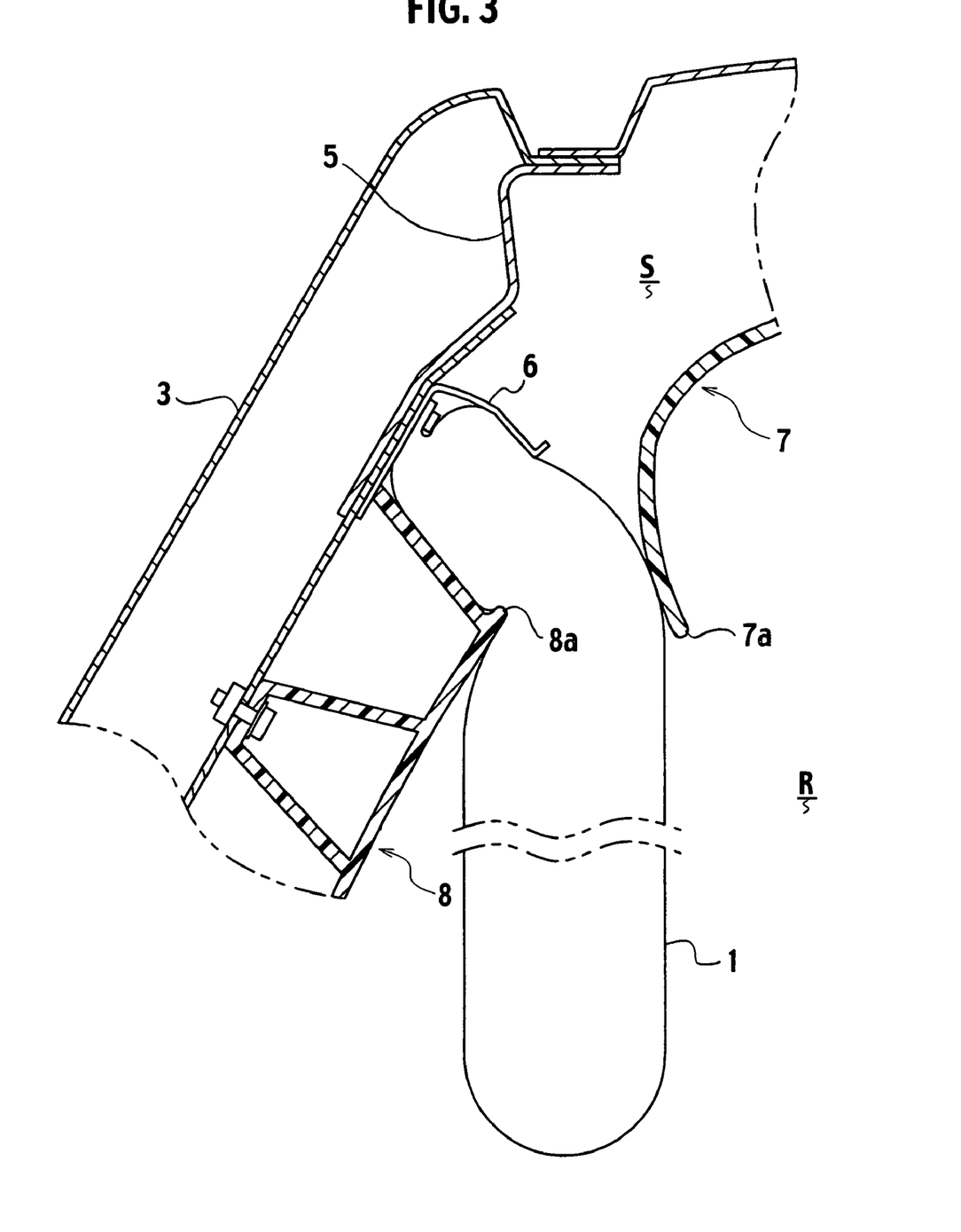
FIG. 3 is similar to FIG. 2 but showing the air bag in a developed state.

The air bag 1 has a base end 1a at an upper end thereof and is fixed to the side roof rail 5 via a bracket 6 which controls a developing direction C of developing the air bag 1. As shown in FIG. 2, the air bag 1 in a folded state is covered with a head lining 7 (interior material) from the vehicular interior R side. In other words, the air bag 1 is installed in a space S between the side roof rail 5 and the head lining 7. A garnish 8 is mounted on the vehicular interior R side of the center pillar 3, and a lower end part 7a of the head lining 7 is engageably supported with an upper end part 8a of the garnish 8.

As shown in FIG. 1, the air bag 1 has a front expansion room 9F and a rear expansion room 9R. An inflator 10 is connected to a rear end part of the air bag 1. Moreover, between the air bag 1's front end part and the front pillar 2, there is provided a strap 11.

<Method>

Figure 4:
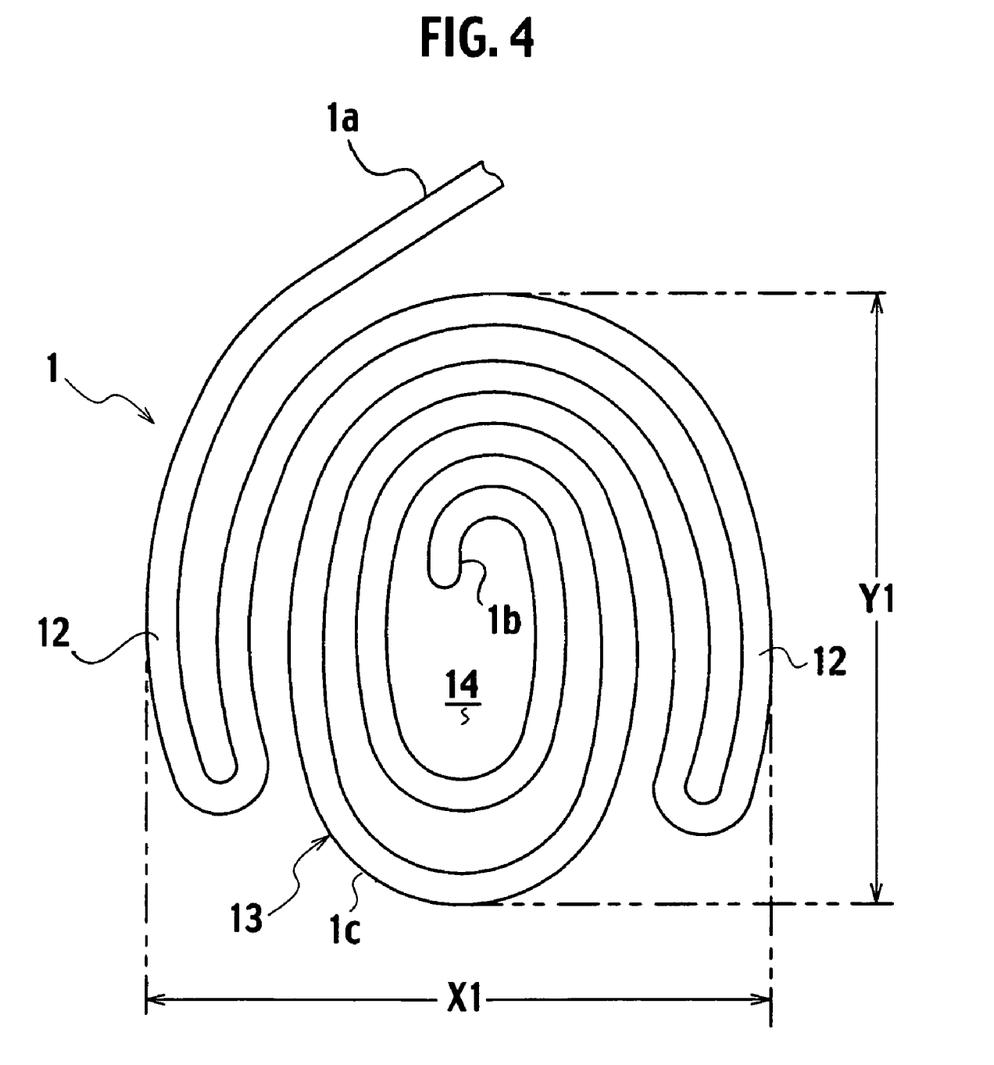
FIG. 4 is a cross sectional view showing an initial state for winding the air bag with a roll part.
Figure 5:
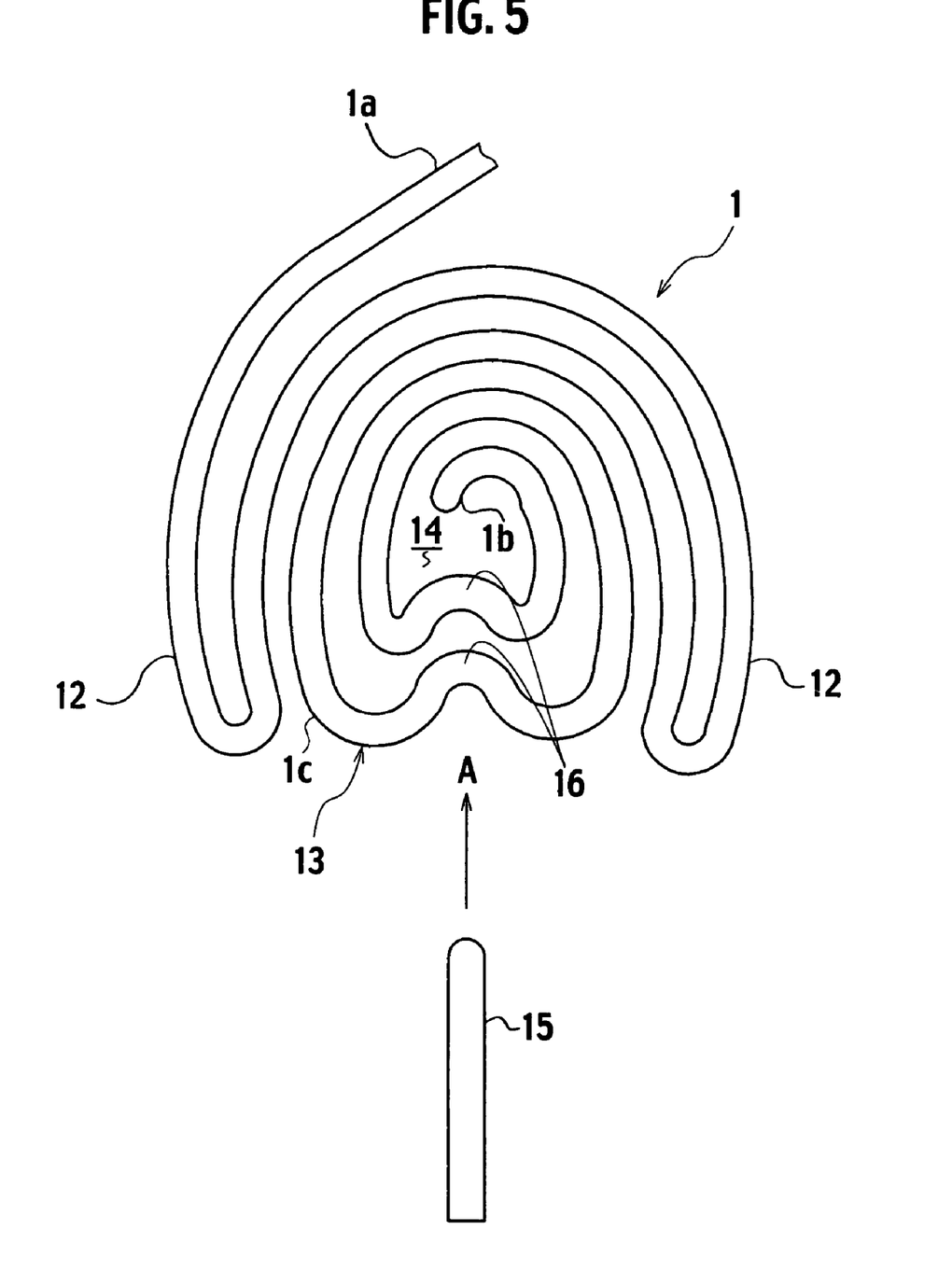
FIG. 5 is a cross sectional view of the air bag in FIG. 4, showing a pushed part in the process of being formed in the roll part.
Figure 6:
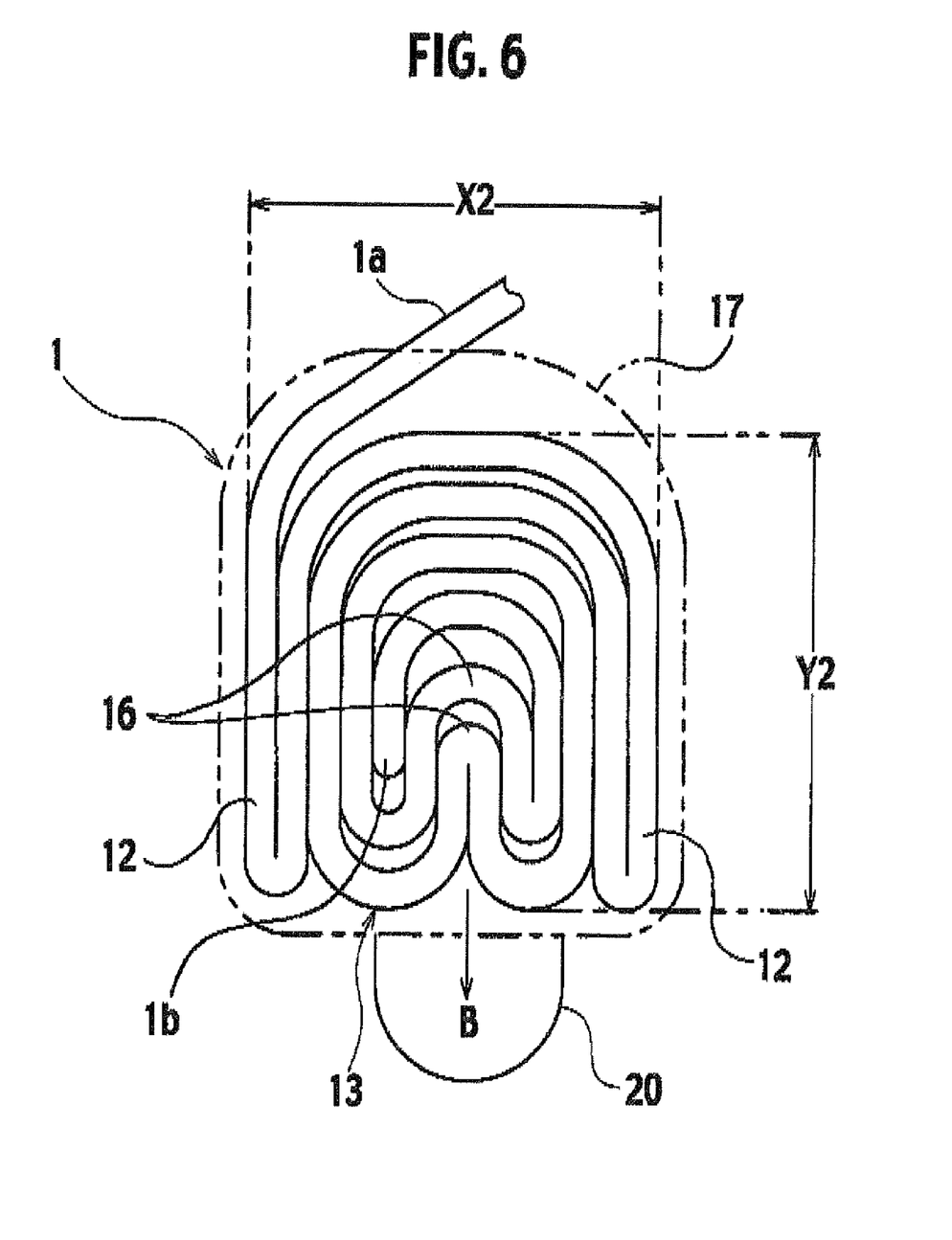
FIG. 6 shows a state after the pushed part is formed on the roll part of the air bag.

Then, referring to FIG. 4 to FIG. 6, a method of folding the air bag 1 is to be described.

An entirety of the air bag 1, which is literally in a form of bag, is at first flattened, to thereafter form a pair of return parts 12 on the base end 1a side. Then, the remaining part of the air bag 1 is wound from a leading end 1b, to thereby form the roll part 13 having an outer face 1c of the air bag 1 (refer to FIG. 4). Thereby, the roll part 13 is wrapped with the pair of the return parts 12. The roll part 13 is loosely wound, thereby having a center thereof formed with a large space part 14. Loosely winding the roll part 13, as it is, is an easy operation. With the roll part 13 loosely wound, a first cross section (first longitudinal dimension Y1 and first lateral dimension X1) of the air bag 1 in the folded state including the pair of the return parts 12 is large.

Then, a lower end center part on the outer face 1c of the roll part 13 (of the air bag 1) is pushed by means of a jig 15 in a pushing direction A toward the center of the roll part 13 (refer to FIG. 5). The above pushing by the jig 15 forms a pushed part 16 on the roll part 13. In the process of forming the pushed part 16, the air bag 1 is stretched in the pushing direction A, thereby increasing winding density of the roll part 13, thus causing a second cross section (second longitudinal dimension Y2 and second lateral dimension X2) smaller than the first cross section (first longitudinal dimension Y1 and first lateral dimension X1). As shown in FIG. 6, the thus folded air bag 1 having the second cross section (smaller) is wrapped with a wrap 17 serving as a holder which is cylindrical and easily collapsible when the air bag 1 is expanded. In the above folded state, the air bag 1 is installed in the side roof rail 5 (vehicular body). In the thus installed state of the air bag 1, as shown in FIG. 2 and FIG. 6, an anti-pushing direction B of the roll part 13 is substantially perpendicular to the lower end part 7a of the head lining 7, in other words, substantially consistent with an opening direction C for opening the lower end part 7a. FIG. 6 also shows a fit-in part 20.

<Effect>

The air bag 1 in the folded state and thereby having the second cross section (smaller) can save the space S (where the air bag 1 is installed) between the side roof rail 5 and the head lining 7, and therefore the head lining 7 does not protrude toward the vehicular interior R side, to thereby prevent a vehicular occupant head part M from being oppressed. Moreover, the air bag 1 can be assuredly installed in a vehicle having the space S that is decreased in size.

When the vehicle causes a sideward collision, the inflator 10 injects a gas into the air bag 1, thereby expanding the air bag 1. As described above, the air bag 1 has such a structure that the pair of return parts 12 wrapping therein the roll part 13 are formed on the base end 1a side of the roll part 13. In the process of expanding the air bag 1, the return parts 12 is expanded, thereby pushing out an entirety of the roll part 13. Thereafter, the roll part 13 can be assuredly developed.

Moreover, in the process of expanding the air bag 1, at first, the pushed part 16 of the roll part 13 comes out in the anti-pushing direction B, thereby returning the roll part 13 to the original loose state. With this, resistance caused by developing the roll part 13 can be decreased, thereby easily developing the roll part 13.

Moreover, the anti-pushing direction B of the roll part 13 is substantially consistent with the opening direction C for opening the lower end part 7a of the head lining 7. With this, the pushed part 16 coming out at first in the anti-pushing direction B in the process of expanding the air bag 1 can push the head lining 7 in the opening direction C, thus opening the head lining 7 to the vehicular interior R side. In addition, from between the thus opened lower end part 7a of the head lining 7 and the upper end part 8a of the garnish 8, the air bag 1 is developed downward in a form of curtain, thereby protecting the vehicular occupant head part M.

Although the present invention has been described above by reference to a certain embodiment, the present invention is not limited to the embodiment described above. Modifications and variations of the embodiment described above will occur to those skilled in the art, in light of the above teachings.

In addition, according to the embodiment of the present invention, the air bag 1 is disposed in the space S between the side roof rail 5 (vehicular body) and the head lining 7 (interior material). The present invention is, however, not limited to this. The air bag 1 is, otherwise, installable in a space between i) a seat frame of a seat and ii) a resin cover (exterior material) for covering the seat frame.

Moreover, it is the wrap 17 that is exemplified to serve as a holder. The present invention is, however, not limited to this.

A tape wound at certain intervals in the longitudinal direction of the air bag 1 can also be used as a holder.

Moreover, the pushed part 16 can be formed partly or entirely in the longitudinal direction of the air bag 1. Specifically, forming of the pushed part 16 may be determined according to arrangement of a hand grip 18 (assist grip) shown in FIG. 1, or defined in a position corresponding to a location (having a narrow internal space) such as an intersection between the center pillar 3 and a roof lining.

Figure 7:
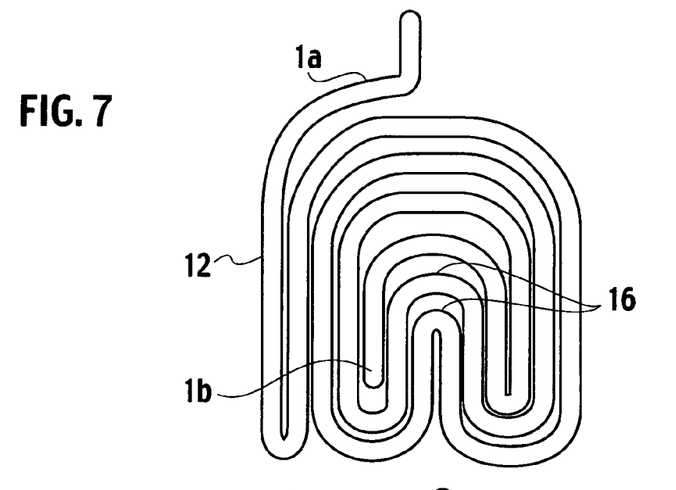
FIG. 7 is a cross sectional view of the air bag, showing a single return part forming one-way structure.

Moreover, in FIG. 4 to FIG. 6 according to the embodiment, the roll part 13 of the air bag 1 is disposed between the pair of return parts 12 and is pushed inward, to thereby decrease the air bag 1 in cross section (packing size). The present invention is, however, not limited to the above structure. Specifically, the following structures are also allowed for decreasing the cross section of the air bag 1:

1) In FIG. 7 (the return part 12 decreased in number), instead of the pair of return parts 12 forming a round-trip structure, the air bag 1 has a single return part 12 forming one-way structure.

Figure 8:
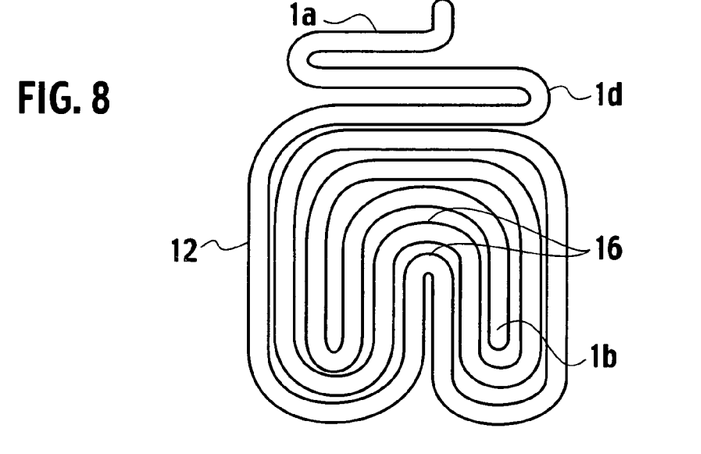
FIG. 8 is a cross sectional view of the air bag, showing a corrugated part.

2) In FIG. 8 (the return part 12 decreased in size), a corrugated part 1d is formed on the base end 1a, and the remaining part neighboring the corrugated part 1d is rolled.

Figure 9:
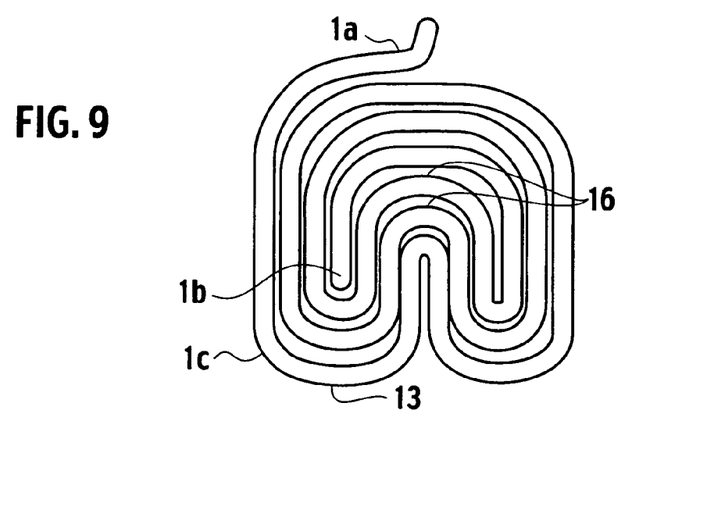
FIG. 9 is a cross sectional view of the air bag, showing substantially an entirety of the air bag is rolled from a base end to a leading end.

3) In FIG. 9, substantially an entirety of the air bag 1 is rolled from the base end 1a to the leading end 1b, followed by pushing the roll part 13 along a part or entirety in a longitudinal direction of the rolling of the air bag 1.

The pushing direction A which is disposed on a line substantially the same as that of the developing (or expanding) direction C (i.e., a direction toward the vehicular interior R) can promote pushing and opening of the head lining 7 and the like. In addition, pushing from the base end 1a (mounting part) side can bring about such an effect as to shift the entirety of the roll part 13 in the direction toward the vehicular interior R. In any of the above cases, the air bag module 100 can be made small in size without tightly winding the roll part 13 per se, rapidly allowing the gas into the air bag 1 in the progress of developing, thereby leading to an improved developability of the air bag 1.

In addition, for the air bag module 100 that is mounted over the center pillar 3 or the hand grip 18 (assist grip), the present invention can be effectively used since the above part {i.e., over the center pillar 3 or the hand grip 18} has only a limited space for receiving the air bag 1 or such spaces are smaller in number than other parts.

This application is based on a prior Japanese Patent Application No. P2005-287039 (filed on Sep. 30, 2005 in Japan). The entire contents of the Japanese Patent Application No. P2005-287039 from which priority is claimed are incorporated herein by reference, in order to take some protection against translation errors or omitted portions.

The scope of the present invention is defined with reference to the following claims.

What is claimed is:

1. An air bag, comprising:
a roll part configured to be wound in a form of a roll when the air bag is in a folded state to be installed in a vehicle, the roll part including:
a pushed part formed by pushing a part of an outer face of the air bag inward to the roll part in a pushing direction, such that the roll part has a decreased cross section by the pushing
wherein the pushing direction is substantially opposite a developing direction of a developing airbag, and
wherein on a base end side of the roll part, a pair of return parts are so formed as to wrap the roll part.

2. A rolled airbag comprising:
a coil portion including a center region and an outer perimeter, the outer perimeter including an inwardly disposed portion, the inwardly disposed portion comprising an outer perimeter portion folded upon itself and toward the center region, the inwardly disposed portion comprising a fold proximate the center region.

3. The rolled airbag of claim 2 installed in at least one of the following spaces:
i) between a vehicular body and an interior material, and
ii) between a seat frame and an exterior material of a vehicle,
wherein,
the rolled air bag, upon activation, expands and opens one or more of the interior material and the exterior material in an opening direction, thereby developing the one or more of the interior material and the exterior material outward from the space.

4. The rolled airbag of claim 2 installed in a space defined between a side roof rail and a head lining of a vehicular body, and
the rolled air bag is expanded upon activation to thereby push a lower end part of the head lining toward a vehicular interior side and thereby open the lower end part, such that the rolled air bag is developed downward in a form of a curtain.

5. The rolled airbag as claimed in claim 2 wherein
the inwardly disposed part is configured to be held by a holder which is collapsible at the expansion of the air bag.

6. The rolled airbag of claim 2 mounted along a side roof rail of a vehicular body and over a center pillar or a hand grip.

7. The rolled airbag of claim 2 formed by:
1) flattening an air bag, to thereby form at least one of the following on a base end side of the air bag:
a single return part, and
two return parts;
2) winding a remaining part of the air bag from a leading end of the air bag, to thereby form a roll part having an outer face of the air bag;
3) wrapping the roll part with the single return part or the two return parts in such a manner as to form a space part in a center of the roll part, to thereby form a first cross section of the roll part; and
4) pushing a lower end center part on the outer face in a pushing direction toward the center of the roll part, to thereby form a pushed part on the roll part.

8. The rolled airbag of claim 7, wherein
in the forming of the pushed part, the air bag is stretched in the pushing direction, thereby increasing a winding density of the roll part, thus causing a second cross section smaller than the first cross section.

9. The rolled airbag of claim 2 formed by
1) flattening an air bag, to thereafter fold a base end of the air bag in such a manner that the base end forms a corrugated part;
2) folding a remaining part of the air bag, in a form of a roll, from a leading end of the air bag to the base end of the air bag, to thereby form a roll part such that the corrugated part is disposed on a rear side in a developing direction of the air bag; and
3) forming a pushed part by pushing the roll part from a front side to the rear side in a pushing direction opposite to the developing direction.

* * * * *